Patented Jan. 22, 1929.

1,700,036

UNITED STATES PATENT OFFICE.

CARLETON ELLIS, OF MONTCLAIR, NEW JERSEY.

LAVAGE VEHICLE.

No Drawing. Application filed December 7, 1926. Serial No. 153,219.

This invention relates to a degreasing vehicle and relates especially to a composition containing isopropanol and tertiary butanol, preferably substantially free from water.

A mixture of these as practically anhydrous liquids containing preferably a minor proportion of the tertiary butanol and especially a mixture in which the butanol content does not exceed 20 per cent of the total solvent serves in accordance with the present invention as a degreasing fluid to remove fats and oils from skins, hides, leather, hair, textiles, and the like.

After degreasing, the vehicle and dissolved fat may be treated with water and the fat precipitated, the vehicle being concentrated by distillation. This method may be used when it is desired to free the fat or oil from substances soluble in the diluted vehicle. In other cases, the vehicle, without dilution with water, may be directly distilled and the fats and oils recovered in the residue.

Being soluble in water, the fire hazard is substantially less than when water-insoluble extraction media such as benzine and benzol are used. Water will extinguish the flames of the extraction medium of the present invention, but merely serves to spread a conflagration caused by benzine or benzol.

For the extraction of fats, oils, etc. from leather, hides, textiles, and the like, these materials are heated with the vehicle, or the latter while hot is allowed to percolate through a mass of such organic materials.

A mixture of 4 parts of isopropanol to 1 part or less, by volume, of tertiary butanol, may be employed. The proportion of the tertiary compound may be substantially increased in some cases. In fact, a major proportion of the latter may be used in the degreasing of some fabrics. The ability of the composition to dissolve fats increases rapidly as water (normally present in isopropanol and tertiary butanol in the crude state) is removed. I prefer to employ a concentration higher than that denoted by the constant boiling point mixtures which these substances apparently form with water. Thus, isopropanol with about 9 per cent of water furnishes a constant boiling point mixture.

The concentration preferably above 95 per cent, and advantageously 98–99 per cent, is a feature of the present invention in the preferred form.

With concentrations approaching 100 per cent, the mixture will even dissolve petroleum oils, and the like, quite readily.

Hence, the composition may be used to extract materials containing various mineral oils as well as its application in the cleansing of textures impregnated with animal or vegetable fats and oils.

*Example 1.*—A concentrated mixture of about 11 volumes isopropanol and 1 volume of tertiary butanol containing approximately 2 per cent of water is passed as a hot liquid, through a mass of crushed oil-bearing seeds, the extract treated with water to cause fractional precipitation, the oil being selectively precipitated, leaving said extractives and coloring matter in solution. After the separation of the oil, the diluted vehicle is reconcentrated.

*Living Creatures.*—The skin and scalp of humans, or the skin and fur of animals likewise may be treated with the degreasing medium to remove excess oil or rancid oil and other skin irritants. For this purpose the 98–99 per cent vehicle containing usually somewhat less than 10 per cent of tertiary butanol, (e. g., 3–7 per cent) preferably is used.

Preferably also I add to this medium a small amount of ethyl acetate. Medicinal agents and skin stimulants such as camphor, oil of bay, gum benzoin, and the like, also may be present, preferably in small proportion, ordinarily not sufficient to impart to the vehicle any strong odor which would be characteristic of such added substances, e. g., camphor, or oil of bay. A small, almost indistinguishable proportion of these substances, however, serves to sweeten the odor of the vehicle. This is of importance in using a vehicle derived from the olefines of still gases (by sulphation and hydrolysis), as these usually contain traces of sulphur or sulphur compounds, or other substances which tend to render the odor somewhat sharp. Sulphur compounds, although believed to be of curative value in skin diseases, and therefore desirably present in some applications of the present invention, nevertheless, may impart an odor to the vehicle which requires correction by the introduction of a minute proportion of an ester such as methyl or ethyl acetate, substances such as camphor or menthol, fragrant oils, such as oil of bay, lavender, wintergreen, and the like. By avoiding the introduction of these substances in any actual perfuming proportions, a vehicle of sweetened odor, but leaving only a very slight odor on evaporation from the skin and hair, is secured.

*Example 2.*—Isopropanol and tertiary butanol mixture containing about 5 per cent of the latter 3 gallons, ethyl acetate 3 fluid ounces, 15 per cent solution of camphor in some of the mixture of isopropanol and tertiary butanol 1½ fluid ounces, solution of oil of bay 1 dram in 1 pint of the mixture of isopropanol and tertiary butanol ½ fluid ounce.

Coloring agents and various curative or medicinal substances, colloidal sulphur, and the like, may be added if desired.

A desirable modification is secured by adding a white mineral oil (or even less highly refined or crude oil) such as a medicinal grade of oil of the character of Nujol to the composition of Example 2. Only a small proportion need be present.

When this oil-containing vehicle is applied to living skin as a degreasing agent, the rancid oils and irritating secretions of the skin are removed to a considerable extent, leaving a trace of the Nujol or similar non-rancidifying oil to exert a beneficial action on the skin and scalp.

I prefer not to add any volatile hydrocarbon or other diluting, extending or modifying substance, which essentially changes the character of said vehicle, desiring in the preferred form of the invention, to employ almost pure isopropanol and tertiary butanol with merely traces of modifying agents.

My invention thus includes a volatile composition of oil-dissolving strength, comprising isopropanol and tertiary butanol, with, at the most, merely traces or small proportions of modifying agents; said strength normally being greater than the constant boiling point strength, preferably being substantially of greater strength approaching the anhydrous state, or, for example, containing not more than 1 to 3 per cent of water; the major proportion of said vehicle preferably being isopropanol as the primary degreasing basis associated with a minor component of tertiary butanol as an accelerator and blending or absorbing agent, the composition containing in some cases, substantially indistinguishable amounts of pleasantly odorous substances capable of sweetening the odor of the composition, preferably without leaving any persistent odor of the vehicle. Substances such for example as camphor, although normally much slower in evaporation than the main constituents of the vehicle, nevertheless may be present in such small amount as to be carried away largely in the evaporation of said main constituents from the skin and hair and thus not leave any persistent odor.

To degrease the human scalp with the employment of a minimum amount of the lavage medium, the scalp is wetted with a small quantity of this medium and then is rubbed dry with a cloth. On the latter will be found a residue of oil and other extractives.

By using a larger proportion of the lavage medium a thorough drenching of the scalp and hair results and the free liquid may be allowed to run off to a collecting vessel. The hair and scalp are then dried.

Despite the natural moisture of the skin, rancid oils are extracted effectively in this way as the concentrated lavage vehicle is penetrating and is not repelled by a moist surface. Being concentrated a slight dilution due to skin moisture does not nullify the oil solvent proporties of the vehicle.

What I claim is:—

1. A volatile lavage and degreasing composition containing not in excess of 3 per cent of water and consisting essentially of isopropanol and tertiary butanol, the latter being present in minor proportion, and substantially indistinguishable amounts of pleasantly odorous substances capable of sweetening the odor of the composition, without leaving a persistent odor on evaporation of the said isopropanol and tertiary butanol.

2. A volatile lavage and degreasing composition containing not in excess of a few per cent of water and consisting essentially of isopropanol and tertiary butanol derived from petroleum and containing a trace of sulphur compounds and of other substances of penetrating odor; said tertiary butanol being present in minor proportion, and substantially indistinguishable amounts of pleasantly odorous substances modifying the odor thereof, without leaving a persistent odor upon evaporation.

3. The process of cleaning oil containing texture bodies, which consists in applying thereto a degreasing vehicle comprising a substantially anhydrous mixture of isopropanol and tertiary butanol, and removing at least a substantial proportion of the vehicle carrying oil dissolved therein.

4. The process of cleaning oil containing texture bodies, which consists in applying thereto a degreasing vehicle comprising a mixture of isopropanol and tertiary butanol, the latter being present in minor proportion.

5. A volatile lavage composition consisting of isopropanol and tertiary butanol, the latter present in amount not exceeding 20 per cent of the total solvent.

6. A volatile lavage composition containing isopropanol, tertiary butanol and water, the alcohols present being greater in amount than the concentration of a constant boiling point mixture of the stated substances.

7. A lavage composition consisting of isopropanol and a minor proportion of tertiary butyl alcohol, but in amount sufficient to enhance the lavage and degreasing properties.

8. A lavage composition consisting essentially of isopropanol and tertiary butanol, the latter being present in minor proportions and water in amount not in excess of 3 per cent, said composition being adapted to cleanse living epidermal surfaces.

CARLETON ELLIS.